(12) United States Patent
Scannell et al.

(10) Patent No.: US 10,723,472 B2
(45) Date of Patent: Jul. 28, 2020

(54) TWO POSITION COWLING ASSEMBLY FOR SINGLE PERSON OPERATION

(71) Applicant: Bell Helicopter Textron Inc., Fort Worth, TX (US)

(72) Inventors: Brent Scannell, Quebec (CA); Thomas Mast, Carrollton, TX (US); Sarah R. Villanueva, Stillwater, OK (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 597 days.

(21) Appl. No.: 15/627,393

(22) Filed: Jun. 19, 2017

(65) Prior Publication Data

US 2018/0362175 A1    Dec. 20, 2018

(51) Int. Cl.
*B64D 29/06*    (2006.01)
*B64D 41/00*    (2006.01)
(Continued)

(52) U.S. Cl.
CPC .............. *B64D 29/06* (2013.01); *B64C 7/02* (2013.01); *B64C 27/04* (2013.01); *B64D 41/00* (2013.01);
(Continued)

(58) Field of Classification Search
CPC .................................................. B64D 29/06; B64D 41/00; B64F 5/40; B64C 7/02; B64C 27/04
See application file for complete search history.

(56) References Cited

U.S. PATENT DOCUMENTS 2,057,555 A * 10/1936 Clark ....................... B60J 5/108
160/190
2,362,552 A   11/1944 Heymann
(Continued)

FOREIGN PATENT DOCUMENTS

EP    2617648 A1    7/2013
EP    3059157    *    4/2015
(Continued)

OTHER PUBLICATIONS

Bell 525 Relentless (Product Diagram), Bell Helicopter, A Textron Company; Flight International from Flightglobal, Tim Hall (FRAeS, Fort Worth, Texas), Reed Business Information, Published Nov. 12, 2014. (1 page).
(Continued)

*Primary Examiner* — Justin M Benedik
(74) *Attorney, Agent, or Firm* — Patent Capital Group

(57) ABSTRACT

One example of a cowling assembly for a rotorcraft includes a stationary fairing affixed to an airframe of the rotorcraft, an articulated fairing hinged on the stationary fairing for articulation relative to the stationary fairing between a closed position, a first partially open maintenance position and a second fully open maintenance position. The articulated fairing is supported in the first maintenance position by a for example gas-charged strut and is releasably locked in the second maintenance position against the stationary fairing by a locking mechanism. The locking mechanism includes a latch blade disposed on the stationary fairing and a latch arranged on the articulated fairing, wherein a latch pin engages with a hole or recess in the latch blade when the latch blade extends through a slot in the articulated fairing.

20 Claims, 6 Drawing Sheets

(51) Int. Cl.
    *B64F 5/40*     (2017.01)
    *B64C 7/02*     (2006.01)
    *E05C 17/12*     (2006.01)
    *B64C 27/04*     (2006.01)
    *B64C 27/06*     (2006.01)

(52) U.S. Cl.
    CPC ................ *B64F 5/40* (2017.01); *E05C 17/12* (2013.01); *B64C 27/06* (2013.01)

(56) References Cited

U.S. PATENT DOCUMENTS

| | | | | |
|---|---|---|---|---|
| 3,004,303 | A * | 10/1961 | Wilmer | B64C 1/14 49/249 |
| 3,063,747 | A | 11/1962 | Anderson | |
| 3,247,892 | A * | 4/1966 | Harmon | B64C 1/1423 160/207 |
| 3,421,296 | A | 1/1969 | Beurer, Sr. | |
| 3,449,891 | A | 6/1969 | Shohet et al. | |
| 5,931,415 | A * | 8/1999 | Lingard | B64C 1/143 244/129.4 |
| 6,155,520 | A | 12/2000 | Giraud et al. | |
| 6,834,834 | B2 * | 12/2004 | Dazet | B64C 1/1407 16/368 |
| 2005/0178887 | A1 * | 8/2005 | Beutin | B64D 27/20 244/54 |
| 2009/0045288 | A1 * | 2/2009 | Nakamura | B64C 1/1415 244/129.5 |
| 2009/0139191 | A1 | 6/2009 | Roundy et al. | |
| 2010/0270423 | A1 | 10/2010 | Lauder | |
| 2014/0260182 | A1 | 9/2014 | Suciu et al. | |
| 2016/0075439 | A1 | 3/2016 | Mores et al. | |
| 2019/0329899 | A1 | 10/2019 | Edler et al. | |

FOREIGN PATENT DOCUMENTS

| | | |
|---|---|---|
| EP | 3059157 A1 | 8/2016 |
| EP | 3418183 A1 | 12/2018 |
| FR | 2642662 A1 | 8/1990 |
| GB | 1201096 A | 8/1970 |
| WO | 2010077241 A1 | 7/2010 |

OTHER PUBLICATIONS

Perry, Dominic, "ANALYSIS: Bell 525 Relentless Cutaway and Technical Description", Flight Global, Flight International, Bell Helicopter, Published Nov. 12, 2014. (8 pages).

EPO Examination Report issued in EP Application 17195407.6 dated May 28, 2018, 6 pages.

EPO Search Report issued in EP Application 17195407.6 dated May 9, 2018, 4 pages.

EPO Examination Report issued in EP Application No. 18184586.8 dated Feb. 8, 2019, 6 pages.

Mueller Environmental Designs Inc., Fred Mueller, President, "Fundamental of Gas Solids/Liquids Separation," printed on Apr. 12, 2018, 15 pages; http://www.muellerenvironmental.com/.

EPO Examining Division Examination Report issued in EP Application No. 18184586.8 dated Jul. 2, 2019, 4 pages.

EPO Examination Report issued in EP Application 17195407.6 dated Oct. 4, 2018, 4 pages.

EPO Search Report issued in EP Application No. 18184586.8 dated Jan. 17, 2019, 5 pages.

USPTO Non-Final Office Action for U.S. Appl. No. 15/963,911 dated Mar. 27, 2020, 11 pages.

\* cited by examiner

TWO POSITION COWLING ASSEMBLY FOR SINGLE PERSON OPERATION

TECHNICAL FIELD

This disclosure relates to a cowling assembly of a rotorcraft that can be operated by a single person in two positions.

BACKGROUND

Some rotorcrafts include cowling assemblies configured to act as a protective fairing around propulsion related components, auxiliary power units (APU) and environmental control units (ECU). For example, a fairing may be used for general drag reduction, but also for providing an aerodynamic flow path from the exterior of the cowling assembly to the engine inlet engine as well as for decorative purposes. In some rotorcraft configurations, ECUs and internal ducts, often for cooling purposes, are arranged forward of the engine underneath the fairing. Fairings have in the past been constructed of aluminum or other light-weight metals, but are more recently increasingly constructed from composite materials, such as carbon fiber reinforced polymer (CFRP). The components located underneath the fairing require occasional or periodic inspection and maintenance which necessitates at least partial removal of the fairing. In some configurations, fairings are hinged on a stationary part of the fuselage.

SUMMARY

This disclosure relates to a cowling assembly of a rotorcraft that can be operated by a single person in two positions.

One innovative aspect of the subject matter described herein can be implemented as a cowling assembly for a rotorcraft, wherein the cowling assembly includes a first fairing affixed to an airframe of the rotorcraft, a second fairing hinged on the first fairing for articulation relative to the first fairing between a closed position, a first partially open maintenance position and a second fully open maintenance position, and a releasable locking mechanism for locking the second fairing against the first fairing in the second maintenance position.

This, and other aspects, may include one or more of the following features. The second fairing may be constructed as a single piece extending laterally over a substantial portion of a width of the rotorcraft and may be constructed of a light-weight composite material. The second fairing may cover environmental control units (ECU) or auxiliary power units (APU) of the rotorcraft. A latch blade may be on the first fairing and project outwardly from an exterior surface of the first fairing. The latch blade may be oriented along a longitudinal direction of the rotorcraft and constructed to reduce drag. The second fairing may include an opening arranged such that the latch blade projects through the opening when the second fairing is opened into the second maintenance position.

For holding the second fairing of the cowling assembly open in the first maintenance position, the cowling assembly may further include a strut extending between the second fairing and the airframe. To support the weight of the second fairing, the strut may be constructed as a gas-charged strut. A first end of the strut may be hinged on either the airframe or the second fairing, and wherein a second end of the strut may accordingly bear, in particular, releasably against either the second fairing or the airframe.

The releasable locking mechanism may be arranged on an underside of the second fairing and may include a latch having a latch pin, wherein the latch pin engages with a recess, such as a hole or a slot, disposed on or in a part of the latch blade that projects through the opening when the second fairing is opened into the second maintenance position. A release mechanism operatively connected to the pin may allow one person to disengage the latch pin from the recess for closing the cowling assembly.

Another innovative aspect of the subject matter described here can be implemented as a locking mechanism for locking a cowling assembly of a rotorcraft in a maintenance position. The locking mechanism includes a latch blade affixed on a stationary first fairing of the cowling assembly and having a free end comprising a recess; and a latch disposed on a pivotable second fairing of the cowling assembly. The latch has a latch pin configured to engage with the recess in the latch blade when cowling assembly is in the maintenance position.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Figure 1:
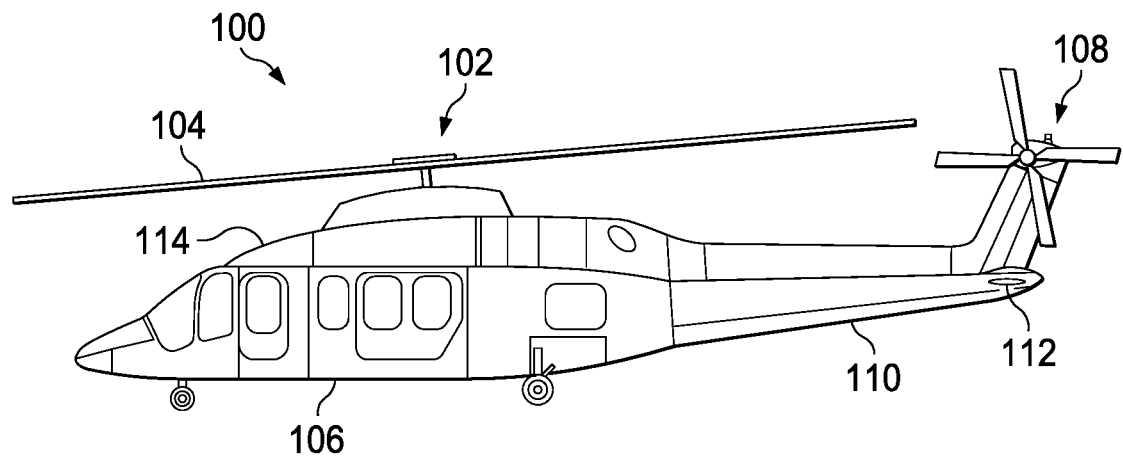
FIG. 1 illustrates an example rotorcraft in accordance with certain embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Like reference numbers and designations in the various drawings indicate like elements. Moreover, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached FIGURES.

FIG. 1 illustrates an example embodiment of a rotorcraft 100. The illustrated example portrays a side view of rotorcraft 100. Rotorcraft 100 includes a rotor system 102 with a plurality of rotor blades 104. The pitch of each rotor blade 104 can be managed or adjusted in order to selectively control direction, thrust, and lift of rotorcraft 100. Rotorcraft 100 further includes a fuselage 106, tail rotor or anti-torque system 108, an empennage 110, and a tail structure 112. In the illustrated embodiment, the tail structure 112 may also include a horizontal stabilizer. Torque is supplied to rotor system 102 and to the anti-torque system 108 using at least one engine. The rotorcraft may also include a variety of cowling assemblies (or cowls) configured as protective fairings to cover components of the rotorcraft and reduce aerodynamic drag. One example cowling or fairing 114 arranged forward of an unillustrated engine may cover and protect, for example, an environmental control unit (ECU). The terms cowling and fairing may hereinafter be used interchangeably.

It should be appreciated that rotorcraft 100 of FIG. 1 is merely illustrative of a variety of aircraft that can be used to implement embodiments of the present disclosure. Other aircraft implementations can include, for example, fixed wing airplanes, hybrid aircraft, tiltrotor aircrafts, unmanned aircraft, gyrocopters, a variety of helicopter configurations, and drones, among other examples. Moreover, it should be appreciated that even though aircraft are particularly well suited to implement embodiments of the present disclosure, the described embodiments can also be implemented using non-aircraft vehicles and devices.

Figure 2:
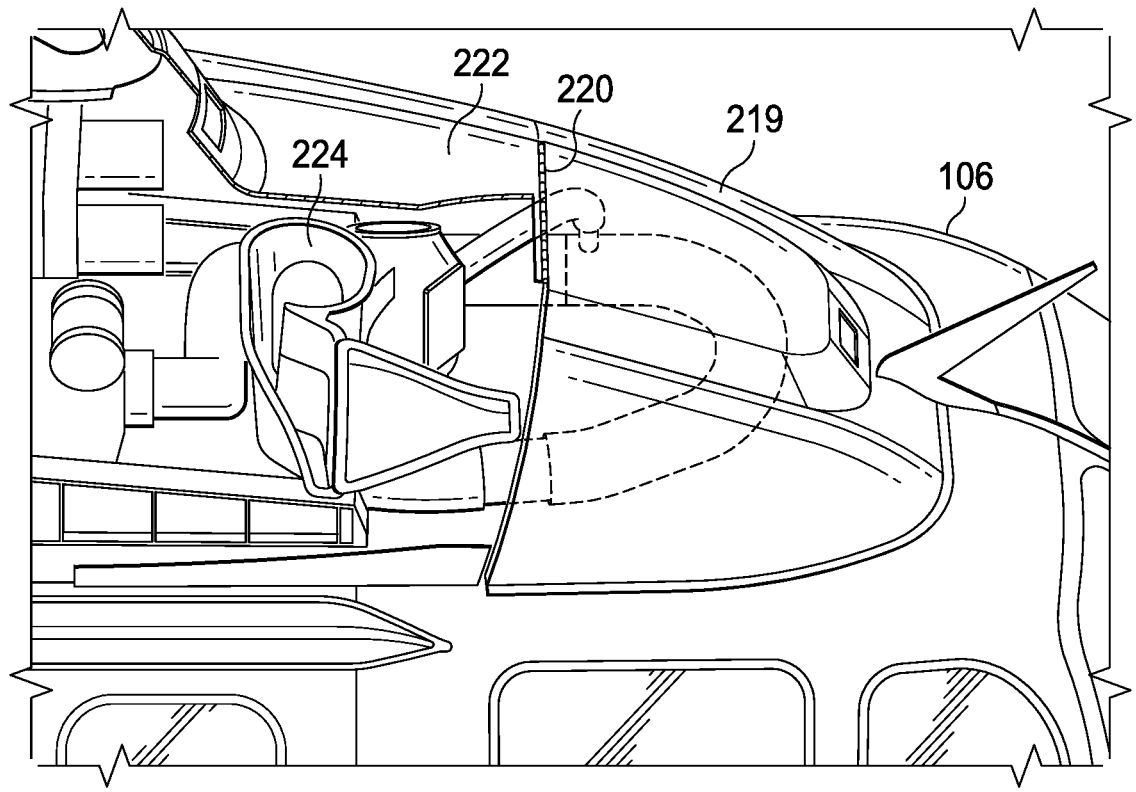
FIG. 2 is a perspective cutout view of an example cowling assembly attached to the fuselage.

FIG. 2 shows in a perspective partially cutout view an example pivotable fairing 222 that is attached by a hinged connection 220 to a stationary forward fairing 219 that is in turn affixed to the fuselage 106 of the rotorcraft 100. Other components of the rotorcraft covered by the fairings 219 and 222, such as a low-pressure air inlet duct 224, are shown for illustrative purposes only and are not otherwise part of the present disclosure.

INTRODUCTION TO THE INVENTION

The embodiments described throughout this disclosure provide numerous technical advantages, including operation of the pivotable fairing 222 in two positions by a single person.

Example embodiments that may be used to implement the operation of the pivotable fairing are described below with more particular reference to the remaining FIGURES.

Figure 3:
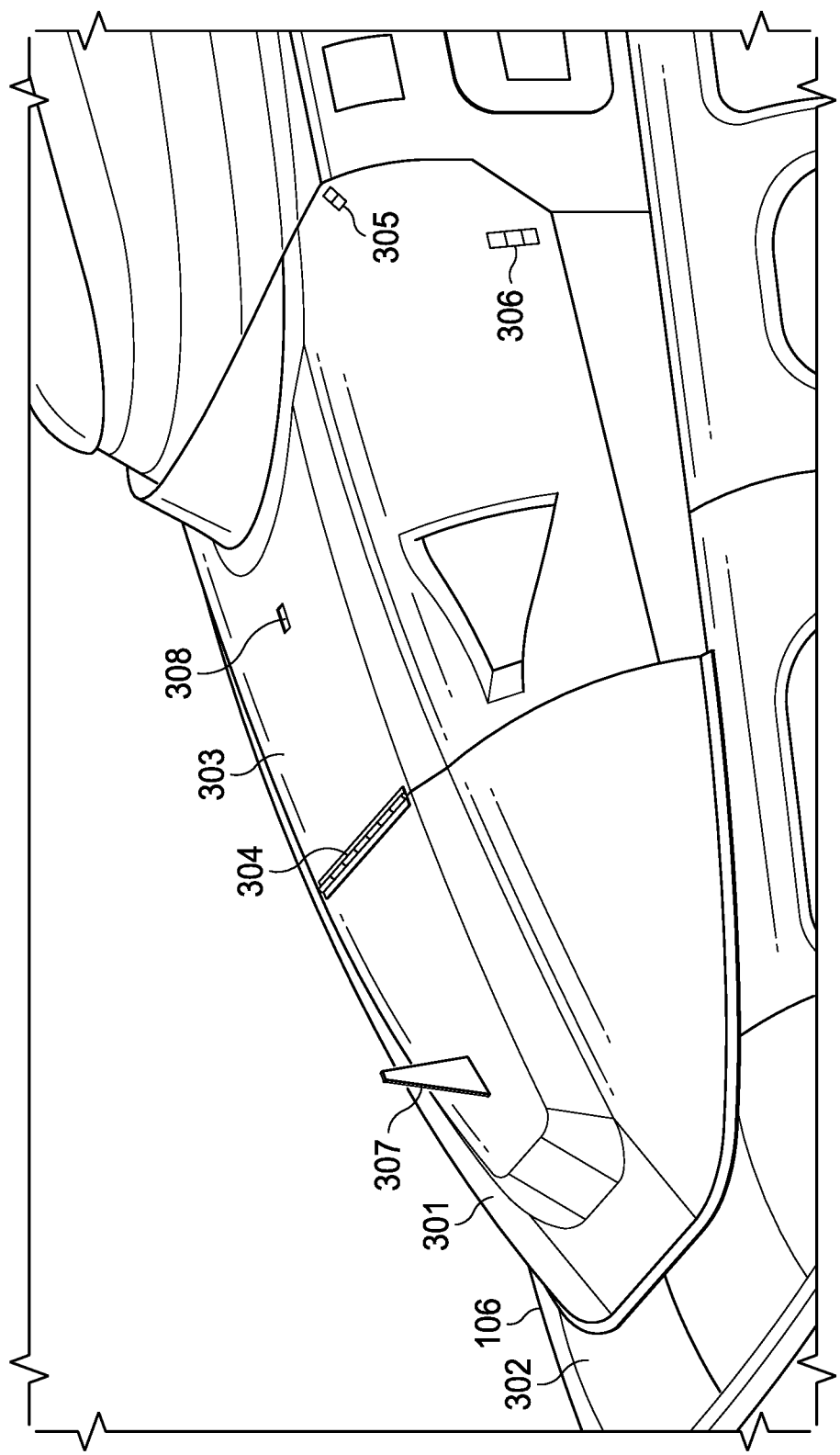
FIG. 3 illustrates another perspective view of an example cowling assembly according to embodiments of the present disclosure.

FIG. 3 illustrates an example embodiment with a first fixed fairing 301 affixed, for example by using rivets or an adhesive, to a top section 301 of the fuselage 106 and a second articulated fairing 303 articulated on the first fairing 301 by way of a hinged connection 304. When closed, as shown in FIG. 3, the second fairing 303 may be releasably secured to the fuselage 106 by a locking mechanism, such as latches, shown schematically as 305, 306. Also shown in FIG. 3 is a, for example fin-shaped, latch blade 307 projecting upwards from the first fairing 301 and a slot 308 disposed in the articulated fairing 303 with a cross-sectional opening that matched the outer contour of the latch blade 307. The shape of the latch blade 307 is selected to minimize drag during flight. The cooperation between the latch blade 307 and the slot 308 will be described hereinafter with reference to the remaining FIGURES.

The first fairing 301 and the second articulated fairing 303 are each constructed as a single piece and extend laterally over a significant portion of the width of the rotorcraft. Accordingly, the second articulated fairing 303 may have considerable weight and may therefore be difficult to open by one person. For example, the specific density of aluminum alloy 6061 is approximately 2.70 g/cm$^3$. Aluminum has greatly diminished in use, from 80 percent of airframes in 1950 to about 15 percent aluminum and aluminum alloys today for airframe construction. Aluminum has been replaced mainly by nonmetallic aircraft materials, such as reinforced plastics and advanced composites, such as carbon fiber reinforced polymer (CFRP). Carbon fiber reinforced polymers have a density of approximately 1.6 g/cm$^3$. They have the advantage of high strength-to-weight ratio, modulus (stiffness to density ratio) 3.5 to 5 times that of steel or aluminum, longer life than metals, higher corrosion resistance, tensile strength 4 to 6 times that of steel or aluminum, and greater design flexibility. Furthermore, the bonded construction eliminates joints and fasteners, making these components easy to repair. Accordingly, fairings constructed from composites will be lighter and, in spite of the reduced weight, will be stronger than comparable components made from aluminum alloys.

It would therefore be much easier for one person to pivot a large articulated second fairing 303 made of carbon fiber reinforced polymers away from the airframe 106. Fairings of this size, i.e. fairings extending over the width of the rotorcraft, are typically not constructed as hinged one-piece access panels.

Figure 4:
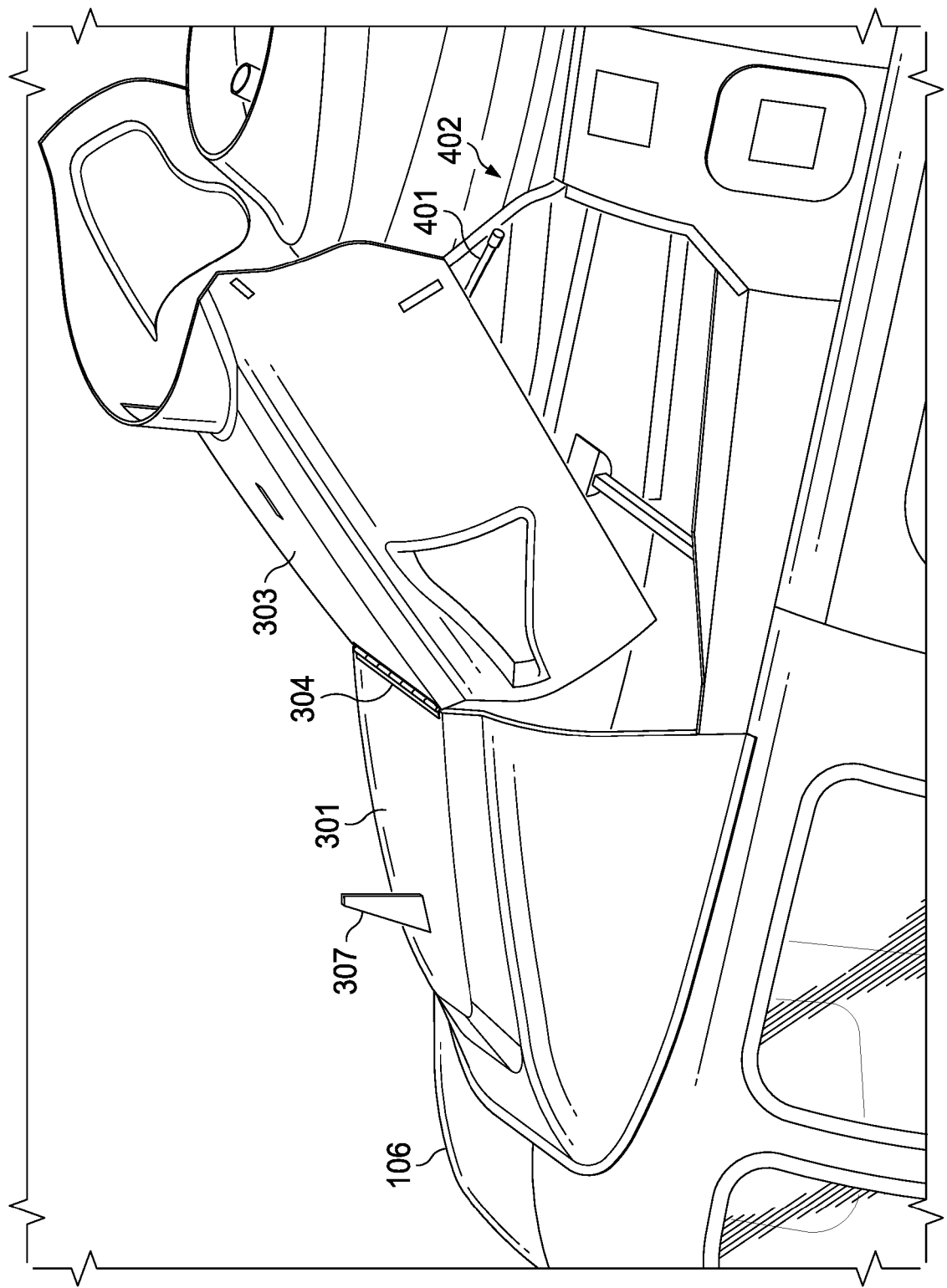
FIG. 4 illustrates the example cowling assembly of FIG. 3 with a hinged fairing in a first partially open position.

After unlocking the locking mechanism 305, 306 of the second fairing 303 that secured the second fairing 303 to the fuselage 106, the second fairing 303 can be pivoted upward into a first maintenance position, as indicated in FIG. 4. In the first maintenance position the second fairing 303 is held in position by at least one strut 401 extending between the top of the airframe 106 and the underside of the second fairing 303. One end of the strut 401 may be attached in an articulated manner either to the underside of the second fairing 303 or to a top portion of the airframe 106 while the other free end of the strut 401 may rest in a respective suitable receptacle or recess disposed on the top portion of the airframe 106 or the underside of the second fairing 303 when the second fairing 303 is held in the first maintenance position. For ease of operation, the strut may be, for example, a gas-charged telescopic strut that compensates for the weight of the fairing 303. In the first maintenance position, the opening created between the second fairing 303 and the top of the airframe 106 may allow a cursory inspection of components located underneath the fairings 301, 303. Although only one strut 401 is shown in FIG. 4, for example two struts 401 arranged on either side of the second fairing 303 may be employed, which is illustrated in FIG. 5.

Figure 5:
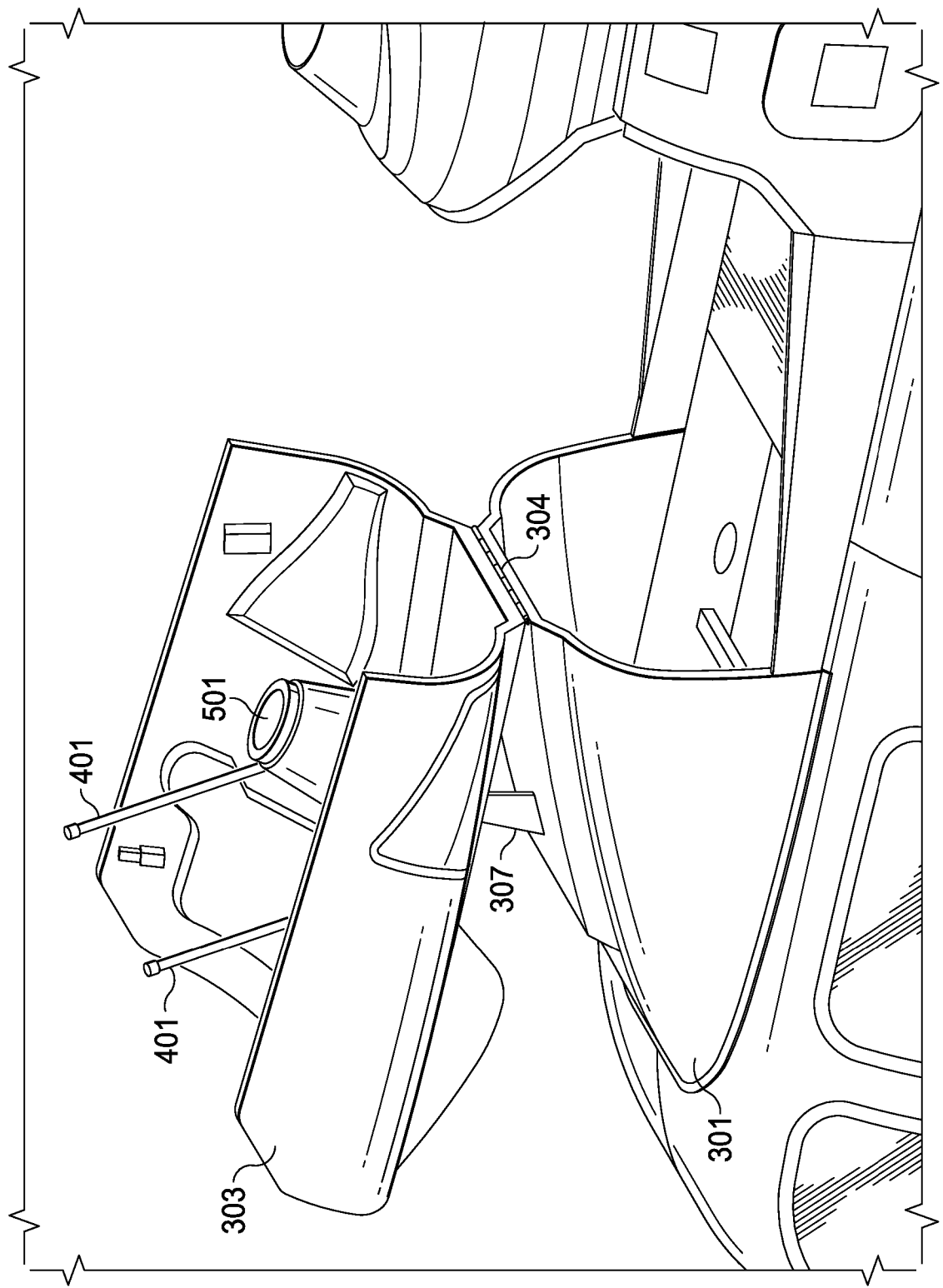
FIG. 5 illustrates the example cowling assembly of FIG. 3 with the hinged fairing in a second fully open position.

To provide a larger unobstructed access to assemblies of the rotorcraft, the second fairing 303 may thereafter be pivoted about the hinged connection 304 all the way into a fully forward position, as illustrated in FIG. 5. In this fully forward position, the latch blade 307 engages with the slot 308 (obstructed from view in FIG. 5) and projects inwardly therethrough into the (concave) underside of the second fairing 303, as will be described in more detail below. Also shown on underside of the second fairing 303 is a duct fitting 501 configured to mate, when the second fairing 303 is closed, for example with an intake air duct 224 shown in FIG. 2.

Figure 6:
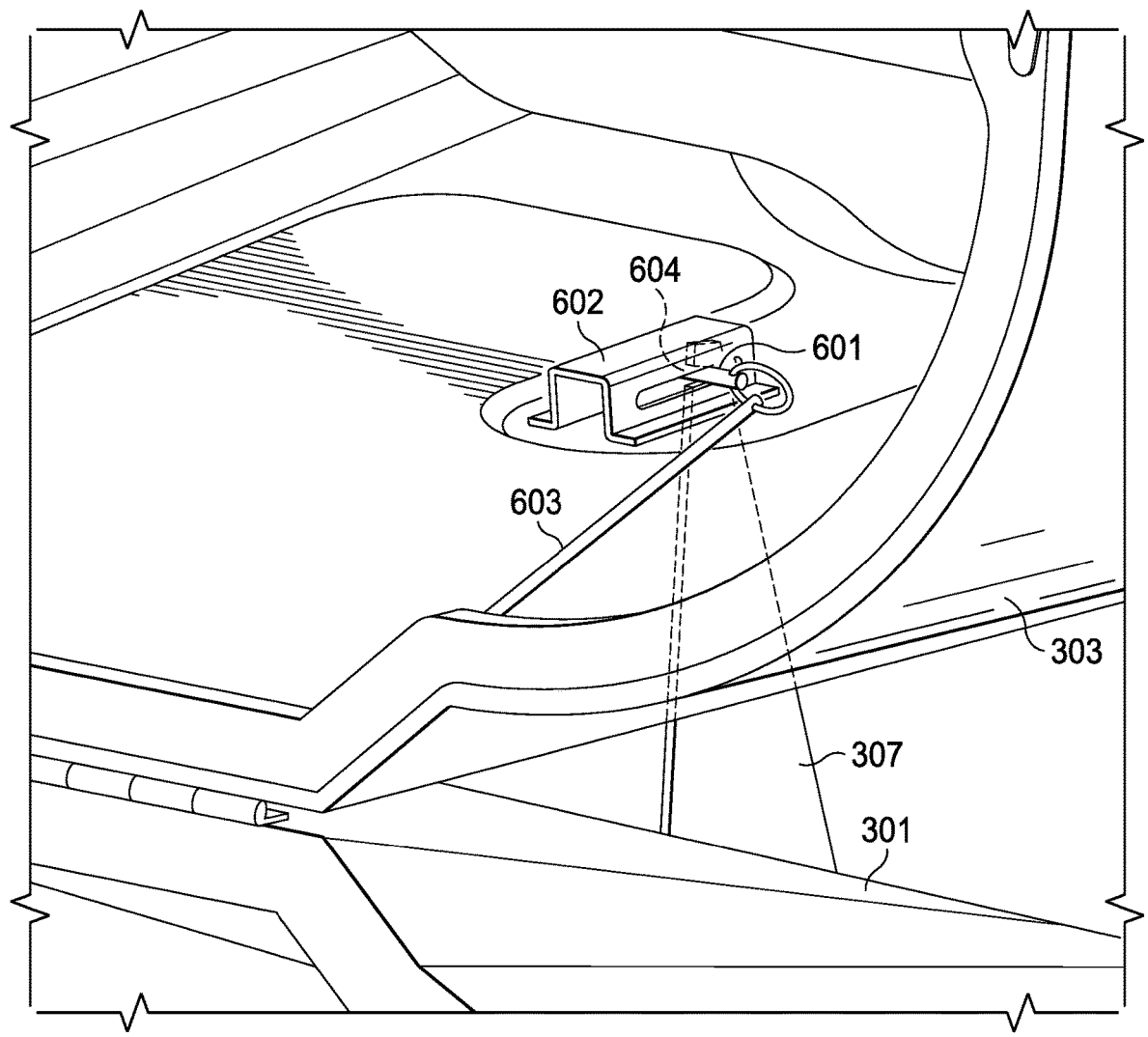
FIG. 6 illustrates the locking mechanism for locking the example hinged fairing of FIG. 4 in the second fully open position.

The engagement of the slot 308 with the latch blade 307 is shown more clearly in FIG. 6. As mentioned above, although the second fairing 303 may have a substantial size, it is light-weight due to its for example composite construction and can therefor present a large surface area subjected to wind pressure. The second fairing 303 must therefore be secured in the second, fully open position, for example, to a stationary part of the airframe 106 to prevent injury to persons working in the maintenance space uncovered by the second fairing 303.

For this purpose, as further shown in FIG. 6, a locking mechanism 602 may be attached on the inside of the fairing 303. The locking mechanism 602 may for example have a pin 601 that engages with an opening 604 (such as a slot, a hole, or recess) disposed on the free end of the latch blade 307, preventing the fairing 303 from pivoting out of the second position back toward the closed position shown in FIG. 3, which may cause a person working on the equipment to be trapped and possibly injured.

Figure 7:
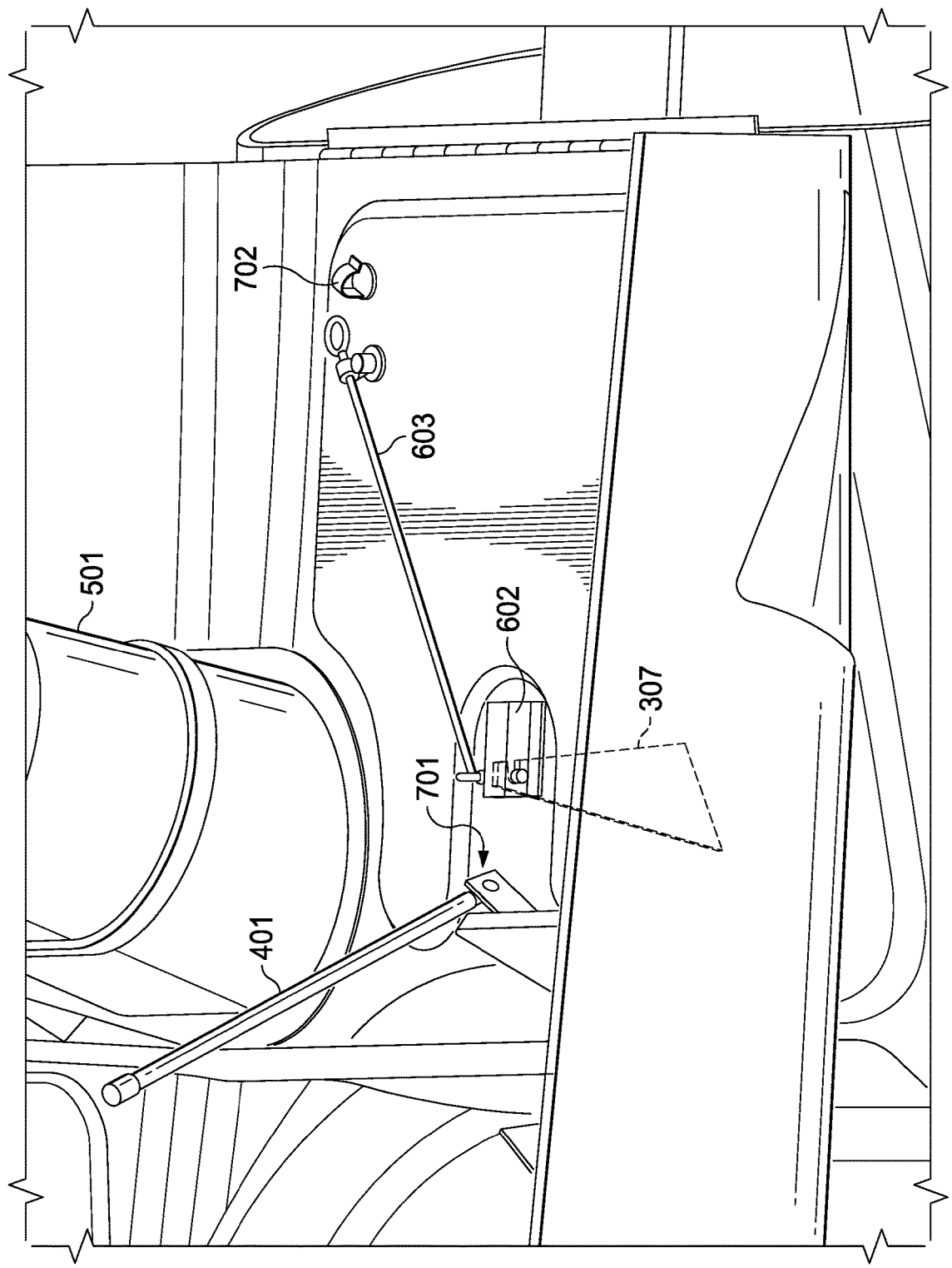
FIG. 7 illustrates a further detail of the locking mechanism of FIG. 6.

As further illustrated in FIG. 6 and more clearly in FIG. 7, the locking mechanism 602 between the pin 601 and the opening 604 may be released by pulling on a release mechanism 603 which may be implemented as a rod or a cable. Any conventional release mechanism may be used for this purpose. FIG. 7 also illustrates that the strut 401 used to hold the second fairing 303 in the first position may be hinged at location 701 to the side of the second fairing 303 and be secured, when not in use, on the inside of the second fairing 303, for example with a clip 702. Alternatively, the strut 401 used to hold the second fairing 303 in the first position may be attached to the airframe in an articulated manner at location 402, as shown in FIG. 4.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

What is claimed is:

1. A cowling assembly for a rotorcraft, the cowling assembly comprising:
   a first fairing affixed to an airframe of the rotorcraft;
   a second fairing hinged on the first fairing for articulation relative to the first fairing between a closed position, a first partially open maintenance position and a second fully open maintenance position; and
   a releasable locking mechanism for locking the second fairing against the first fairing in the second maintenance position,
   a latch blade disposed on the first fairing and projecting outwardly from an exterior surface of the first fairing,
   the second fairing comprising an opening arranged such that the latch blade projects through the opening when the second fairing is opened into the second maintenance position,
   wherein the locking mechanism is arranged on an underside of the second fairing and comprises a latch having a latch pin, and wherein the latch pin engages with a recess disposed on or in a part of the latch blade that projects through the opening when the second fairing is opened into the second maintenance position.

2. The cowling assembly of claim 1, wherein the second fairing is constructed as a single piece extending laterally over a substantial portion of a width of the rotorcraft.

3. The cowling assembly of claim 1, wherein the second fairing covers an environmental control unit (ECU) or an auxiliary power unit (APU) of the rotorcraft.

4. The cowling assembly of claim 1, wherein the latch blade is oriented along a longitudinal direction of the rotorcraft and constructed to reduce drag.

5. The cowling assembly of claim 1, further comprising at least one strut extending between the second fairing and the airframe, and configured to hold the second fairing in the first maintenance position.

6. The cowling assembly of claim 5, wherein the at least one strut is constructed as a gas-charged strut.

7. The cowling assembly of claim 5, wherein a first end of the at least one strut is hinged on either the airframe or the second fairing, and wherein a second end of the at least one strut bears releasably against either the second fairing or the airframe.

8. The cowling assembly of claim 1, wherein the recess is constructed as a hole or a slot.

9. The cowling assembly of claim 1, wherein the locking mechanism further comprises a release mechanism configured to disengage the latch pin from the recess.

10. The cowling assembly of claim 9, wherein the release mechanism is constructed as a cable or rod connected to the latch pin.

11. The cowling assembly of claim 1, wherein the cowling assembly is constructed of a composite material.

12. A locking mechanism for locking a stationary first fairing of a cowling assembly of a rotorcraft with a pivotable second fairing of the cowling assembly in a maintenance position, the locking mechanism comprising:
- a latch blade affixed on the stationary first fairing of the cowling assembly and projecting outwardly from an exterior surface of the first fairing, the latch blade having a free end comprising a recess; and
- a latch disposed on an underside of a pivotable second fairing of the cowling assembly, wherein the second fairing comprises an opening arranged such that the latch blade projects through the opening when the second fairing is opened into the maintenance position, and wherein the latch comprises a latch pin configured to engage with the recess in the latch blade when cowling assembly is in the maintenance position.

13. The locking mechanism of claim 12, further comprising a release mechanism configured to disengage the latch pin from the recess.

14. The locking mechanism of claim 13, wherein the release mechanism is constructed as a cable or rod connected to the latch pin.

15. The locking mechanism of claim 12, wherein the latch blade is oriented along a longitudinal direction of the rotorcraft and constructed to reduce drag.

16. The locking mechanism of claim 12, wherein the recess is constructed as a hole or a slot.

17. The locking mechanism of claim 12, wherein the cowling assembly is constructed of a composite material.

18. A method for locking a pivotable fairing hinged on a stationary fairing of a cowling assembly for a rotorcraft in two maintenance positions, the method comprising:
- opening the pivotable fairing to a first partially open maintenance position and supporting the pivotable fairing on an airframe of the rotorcraft in the first maintenance position;
- opening the pivotable fairing from the first maintenance position to a second fully open maintenance position, and
- engaging in the second maintenance position a recess of a latch blade disposed on the stationary fairing and projecting outwardly from an exterior surface of the stationary fairing with a latch pin of a latch disposed on an underside of the pivotable fairing when the latch blade projects through the opening in the second maintenance position.

19. The method of claim 18, wherein the pivotable fairing is supported on the airframe by at least one strut which has a first end hinged on either the airframe or the pivotable fairing and a second end that bears releasably against either the second fairing or the airframe.

20. The method of claim 18, wherein the latch pin is disengaged from the recess of the latch blade by operating an actuating device operatively connected to the latch pin.

* * * * *